(12) United States Patent
Bigi

(10) Patent No.: US 11,050,375 B2
(45) Date of Patent: Jun. 29, 2021

(54) METHOD AND APPARATUS FOR TUNING OF ELECTRIC MOTOR PARAMETERS

(71) Applicant: Zapi S.P.A., Poviglio (IT)

(72) Inventor: Gionata Bigi, Poviglio (IT)

(73) Assignee: Zapi S.P.A., Poviglio (IT)

( * ) Notice: Subject to any disclaimer, the term of this patent is extended or adjusted under 35 U.S.C. 154(b) by 0 days.

(21) Appl. No.: 16/827,031

(22) Filed: Mar. 23, 2020

(65) Prior Publication Data

US 2020/0304048 A1 Sep. 24, 2020

(30) Foreign Application Priority Data

Mar. 21, 2019 (EP) ..................................... 19164336

(51) Int. Cl.
   *H02P 21/16* (2016.01)
   *H02P 21/00* (2016.01)
   *H02P 21/20* (2016.01)
   *H02P 23/14* (2006.01)

(52) U.S. Cl.
   CPC ...... *H02P 21/0017* (2013.01); *H02P 21/0021* (2013.01); *H02P 21/16* (2016.02); *H02P 21/20* (2016.02); *H02P 23/14* (2013.01)

(58) Field of Classification Search
   None
   See application file for complete search history.

(56) References Cited

U.S. PATENT DOCUMENTS

| 2010/0060210 A1* | 3/2010 | Liu | ......................... H02P 21/14 318/400.02 |
| 2016/0169974 A1* | 6/2016 | Bertolasi | ................ G01R 31/34 702/65 |
| 2017/0085202 A1* | 3/2017 | Yoo | ......................... H02P 21/14 |

FOREIGN PATENT DOCUMENTS

WO  20140099970 A1  6/2014

OTHER PUBLICATIONS

European Search Report issued by the European Patent Office for corresponding European Patent Application No. 19164336.0, dated Aug. 23, 2019, 8 pages.

* cited by examiner

*Primary Examiner* — Bentsu Ro
(74) *Attorney, Agent, or Firm* — Moore & Van Allen PLLC; Henry B. Ward, III

(57) ABSTRACT

A method is provided for determining a parameter of a field-oriented control (FOC) model for an electric power unit, the electric power unit comprising a three-phase electric motor and an inverter drive for driving the electric motor. The method comprises sending a control signal to the inverter drive; applying a predefined electric voltage to at least two of the phases of the electric motor by the inverter drive in response to the control signal; measuring an electric current that flows in the at least two phases of the electric motor in response to the applied electric voltage; and determining the parameter of the control model for the electric power unit using a value of the applied predefined electric voltage and a value of the measured electric current. An apparatus for determining a parameter of a control model for an electric power unit is provided.

20 Claims, 2 Drawing Sheets

METHOD AND APPARATUS FOR TUNING OF ELECTRIC MOTOR PARAMETERS

FIELD OF THE INVENTION

The invention refers to computer-implemented method for determining a parameter of a field-oriented control model for an electric power unit, and an apparatus for determining a parameter of a field-oriented control model for an electric power unit.

PRIOR ART

The electrification of mobile applications (off road and on road vehicles) is becoming more and more popular. Some applications like Material Handling (forklifts) and Aerial Work Platform (scissor lift, boom lift) have started the path of electrification some decades ago and nowadays the majority of these vehicles sold around the world are fully electric (the battery being the source of energy) or hybrid (electric motors are used to support traditional Internal Combustion engines based on different architectures). This trend towards electrification is now very strong also in other mobile applications, like on road vehicles (buses, trucks, passenger cars) and off road (Construction equipment, Agriculture, Port equipment and so on). The main driver for this trend is that the number of vehicles worldwide is rapidly increasing due to the growing economies of the emergent countries, like China. The consequence is that the pollution generated by the traditional IC engines (in terms of CO2, NOx and PM generation) is critical for the health of the human beings and, more in general, of the environments. Furthermore, the IC engines strongly contribute to the global warming trend. The electrification of a vehicle reduces dramatically the pollution, because it is based on the clean electric energy; furthermore, the poor efficiency IC engines is replaced by high efficiency electric motors. The best IC engines is able to reach a 35% efficiency, which means that 65% of the energy stored in the tank is dissipated into heat. A good, modern electric motor can reach efficiency of 95% (which means that only 5% of the converted energy is dissipated into heat!).

The electrification of a vehicle is based on three main components: a source of energy (typically a battery or a generator driven by an IC motor (the so called Genset)); an inverter (power electronic device) to convert the battery electric energy into electric energy to drive an electric motor and finally the electric motor which converts the electric energy into mechanical energy to move the vehicle.

Since this electrification trend is spreading more and more in different applications, it becomes more and more important to increase the efficiency of the conversion of the electrical energy stored in the battery (or generated by the Genset) into mechanical energy. Many steps ahead in the recent years have been done by the technology to decrease the losses of this conversion (or, in other words, to increase the overall efficiency). For example:

New, more efficient power electronic devices have been invented and are now used in the power inverters, with the result that the inverter losses have strongly been decreased.

New technologies have been introduced in the electric motor design (the old, low efficiency DC brushed motors have been replaced by the AC Induction motors and these are now in progress to be replaced by Permanent magnet (PM) synchronous motors (with various type of Em design, optimized for each specific application). These new technologies have guaranteed an increase of efficiency up to 20% in some operating points (from an eff range=75 to 80% of a DC motor; to an efficiency range=80 to 88% of an ACIM; finally to an efficiency range of 90 to 95% of a PM motor).

Another important aspect which has to be considered in order to increase the efficiency of an electric motor is the performance of the digital motor control algorithm which is implemented in the software of the power inverter (digital control based on microcontrollers). The good performance of this algorithm can permit to gain some % of efficiency in any operating point of a motor. Indeed, the challenge is to drive the e-motor in the best optimized way in any operating point. In fact, in a mobile application like a vehicle, the typical motor speed range is from 0 to 10.000 rpm or more; and the motor Torque range can span form few Nm up to hundreds Nm. In many standard stationary industrial applications, the e-motors spins at constant speed and outputs a nearly constant power for most of its operating time. On the contrary, in an off road and on-road vehicle, the speed and power ranges of the e-motors are very wide and it is mandatory to drive the motor in an optimized way in all this very wide operating range of speed and power.

In order to stress the importance to drive the e-motor in the optimized way, we provide here a simple example of the impact that a 1% of higher efficiency (which means an average energy saving of 1%) can have on the use of a vehicle like an electric forklift truck of medium size.

A) Energy used during 1 shift (8 hrs) of operation: 30 KWh. If 1% of energy is saved per each motor means that during 1 shift we can save about 1 KWh of energy. If we consider 3 shifts, this means that in one day we can save 3 KWh of energy. This energy is taken from the battery, which in turns is charged by a battery charger which takes energy from the distribution network. Considering an overall efficiency of 75% in the battery charging/discharging process, we can come to the conclusion that one truck saves nearly 1.2 KWh per day of operation. Which, in turn, means a saving of 300 KWh (0.3 MWh) in one year of operation (considering 250 working days per year). Finally, considering the cost of energy at 0.2 €/KWh, this means a total saving of 60 € per year.

B) If we consider a fleet of 250 trucks of a typical logistic center, which works on 3 shifts, this means that in one day we can save 300 KWh of energy. Which, in turn, means a saving of 75.000 KWh (75 MWh!) in one year of operation (considering 250 working days per year). Finally, considering the cost of energy at 0.2 €/KWh, this means a total saving of 15.000 € per year (TCO=Total Cost of Ownership).

C) Enlarging even more the view, we can consider that in the world every year are sold 1.000.000 new forklift trucks and we can estimate that 10.000.000 fork lift trucks are operative in the world. This 1% of energy saved in one motor, corresponds, based on previous calculation, to 3 MWh saved every year or 10.000 GWh which is comparable to the energy necessary to supply a western town of 300.000 inhabitants.

Based on all the consideration above, and considering the strong trend to increase the number of electrified vehicles worldwide in any market segment which will result in having tens of millions of electric vehicles operative in about 1 decade, it is clear how important is to optimize the motor control algorithms in order to guarantee that the e-motor is always used in the most efficient way. Just a 1% of efficiency increasing results in a big amount of energy saving. If we consider that an electric motor of new generation, like a PMAC brushless motor, can have 20% more efficiency than an older generation DC brushed motor, it becomes evident that the energy saving can be huge, but at the same time it becomes evident how important it is to control these motors of latest technology with very optimized and efficient control algorithms.

A further, final, but very important consideration is that the electric motor, and particularly the motors of the latest technology, are complex machines whose control is based on sophisticated software algorithms which are based on the good knowledge of some key motor parameters. Indeed, the motor control is based on following pillars:
1) The knowledge of the motor mathematical model.
2) An optimized knowledge of the parameters of this model.
3) A robust software implementation and the use of powerful microcontroller of latest technology which ensure a wide bandwidth.

The subject of this invention is focused on the second point, which is related to how to reach a perfect knowledge of the parameters of the motor model, since these parameters change from motor to motor and are key factors for the optimal work of the control algorithm. Indeed, even the most sophisticated algorithm, running on the most powerful microcontroller, cannot achieve the best performance if the motor model parameters are wrong or not accurately known.

The above-mentioned software algorithms include a field oriented control of an electric motor, also known as vector drive, involves a direct-quadrate model of a three-phase electric motor to control torque and flux of the motor independently. The Direct Quadrature (d-q) transformation is a mathematical transformation used to simplify the analysis of a three-phase circuit. The d-q transformation reduces the three AC quantities to two quantities (stationary and rotating). Simplified calculations can then be carried out on these imaginary quantities before performing an inverse transformation to recover the actual three-phase AC results.

A magnetic field is created by current flowing through a coil. In AC circuits, the current is not necessarily in phase with voltage. Depending on coil inductance, back EMF generated as the motor spin, and other factors, the current phase will be shifted more or less relative to the voltage phase.

The Field Orientated Control (FOC) consists of controlling the stator currents represented by a vector. This control is based on projections which transform a three phase time and speed dependent system into a two coordinate (d and q coordinates) time invariant system (direct-quadrate model, d-q-model). These projections lead to a more simple structure similar to that of a DC machine control. Field oriented control of electric machines is fundamentally based on two time invariant quantities: the torque component (aligned with the q coordinate) and the flux component (aligned with d coordinate).

DESCRIPTION OF THE INVENTION

The invention has been made to provide an accurate determination of the parameters of a control algorithm for an electric motor.

The invention provides a method according to claim 1.

Claim 1 is directed to a computer-implemented method for determining a parameter of a field-oriented control, FOC, model for an electric power unit, the electric power unit comprising a three-phase electric motor and an inverter drive for driving the electric motor, the method comprising the steps of: sending a control signal to the inverter drive; applying a predefined electric voltage to at least two of the phases of the electric motor by the inverter drive in response to the control signal; measuring an electric current that flows in the at least two phases of the electric motor in response to the applied electric voltage; and determining the parameter of the control model for the electric power unit using a value of the applied predefined electric voltage and a value of the measured electric current.

Optionally the method may comprising the further step of storing the determined parameter in a memory of the inverter drive.

The advantage of the method according to the invention is that the parameter(s) of the FOC model can be obtained for an assembled electric power unit (inverter and electric motor) and that it includes effects (distortions) due to the inverter circuit as well as wirings and other electric components of the unit. This significantly reduces the time required for determining the parameter(s) and/or improves the precision of the parameter(s).

The method according to the invention may be developed in that the step of applying the predetermined voltage comprises: (i) applying an electric voltage between the at least two phases of the electric motor in accordance with the control signal; (ii) measuring the actual electric voltage between the at least two phases of the electric motor in response to the applied electric voltage; and (iii) adjusting the control signal until the actual electric voltage is equal to the predefined electric voltage.

The steps (i), (ii), and (iii) may be performed in an electronic feedback loop.

According to another development, the step of applying the predefined electric voltage may comprise applying a DC voltage in form of a step, wherein the determined parameter is a resistance.

In another development, the method may further comprise the step of measuring a response time between the applied electric voltage and the measured electric current.

In another development, the method may further comprise a step of measuring a variation, within a fixed time, of an electric current value in response to the applied electric voltage.

In still another development, the step of applying the predetermined electric voltage may comprise applying a square wave pulse, wherein the determined parameter is a stator transient time constant. Optionally, the determined stator transient time constant may be used to calculate inductance values and/or resistance values of an equivalent model of the motor, in particular of a direct-quadrate, d-q, model of the motor.

According to another development, a voltage and frequency control is applied and a resulting magnetization current is measured, and a magnetizing inductance is calculated. Optionally, the frequency may be ramped between a plurality of measuring points in time and the motor allowed to settle to a steady state at each new operating point before the currents are measured.

The determined magnetization current and magnetization inductance may be used to calculate an optimal magnetization for any operating point of the electric motor in order to achieve the most efficient operation depending on an operation mode of the electric motor, such as MTPA (maximum torque per Ampere) or MTPV (maximum torque per volt).

In another development, the method may be performed in real-time under operating conditions of the electric power unit, in particular continuously during operation of the electric power unit or after a predetermined amount of time has elapsed after an initial parameter determination.

The invention further provides an apparatus according to claim 9.

Claim 9 is directed to an apparatus for determining a parameter of a field-oriented control, FOC, model for an electric power unit, the electric power unit comprising a three-phase electric motor and an inverter drive for driving the electric motor, the apparatus comprising a processing circuitry (50) comprising: a voltage control unit configured to send a control signal for applying an electric voltage between at least two phases of the electric motor to the inverter drive of the electric power unit; a voltage measuring unit configured to measure an actual electric voltage between the at least two phases of the electric motor in response to the applied electric voltage and to adjust the control signal until the actual electric voltage is equal to a predefined electric voltage; a current measuring unit configured to measure an electric current flowing in the at least two phases of the electric motor in response to the applied predefined electric voltage; and a processor configured to determine the parameter of the control model for the electric power unit using a value of the applied predefined electric voltage and a value of the measured electric current.

The apparatus according to the invention can be developed such that the processor is configured to determine a response time between the applied electric voltage and the measured electric current.

According to another development, the voltage control unit is configured to send a control signal to the inverter drive to apply a DC voltage in form of a step, wherein the processor is configured to determine a resistance of the FOC model based on a value of the DC voltage and the value of the measured electric current.

In another development the voltage control unit is configured to send a control signal to the inverter drive to apply a square wave pulse, wherein the processor is configured to determine a stator transient time constant; and optionally to calculate inductance values and/or resistance values of an equivalent model of the motor, in particular of a direct-quadrate, d-q, model of the motor, based on the determined stator transient time constant.

According to another development, the voltage control unit is configured to send a control signal to the inverter drive to apply the voltage having a frequency and the current measuring unit is configured to measure a resulting magnetization current, and the processor is configured to calculate a magnetizing inductance; and optionally, the voltage generating unit is configured to ramp the frequency between a plurality of measuring points in time and the current measuring unit is configured to measure the magnetization currents after the motor has settled to a steady state at each new operating point.

In another development, the apparatus is configured to perform the parameter determination in real-time, in particular within less than a rotation period of the electric motor, preferably less than 0.1 times the rotation period, more preferably less than 0.01 times the rotation period, and/or under operating conditions of the electric power unit.

The determined parameters may be stored in a memory of the apparatus according to the invention. Alternatively or additionally, the processor may configured to store the determined parameter in a memory of the inverter drive.

Alternatively, the processing circuitry may be integrated into the inverter drive.

The advantages of the apparatus according to the invention and its developments correspond to the respective advantages of the method according to the invention and its developments.

Additional features and advantages of the present invention will be described with reference to the drawings. In the description, reference is made to the accompanying figures that are meant to illustrate preferred embodiments of the invention. It is understood that such embodiments do not represent the full scope of the invention.

EMBODIMENTS

Various illustrative embodiments of the disclosure are described below. In the interest of clarity, not all features of an actual implementation are described in this specification. It will of course be appreciated that in the development of any such an actual embodiment, implementation-specific decisions must be made to achieve the developers specific goals, such as compliance with system-related and business-related constraints, which will vary from one implementation to another.

The following embodiments are described in sufficient detail to enable those skilled in the art to make use of the disclosure. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

Figure 1:
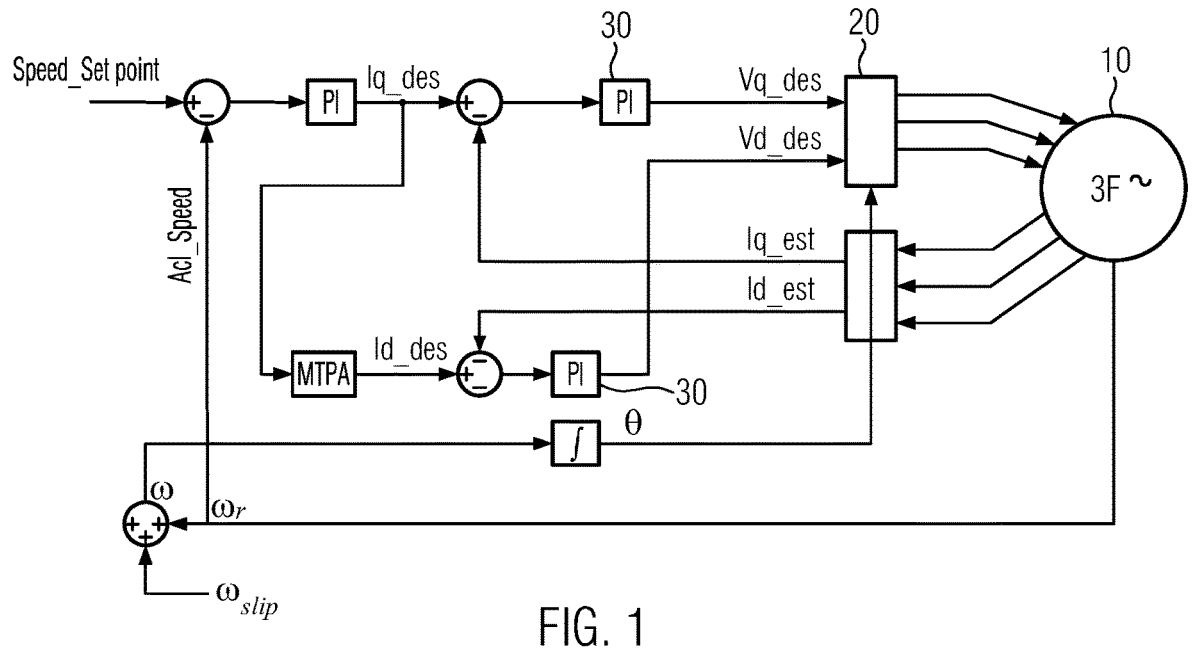
FIG. 1 illustrates a generic FOC block diagram.

FIG. 1 illustrates a generic driving circuit (generic FOC block diagram) useful for understanding the method according to an embodiment of the invention.

The invention provides a computer-implemented method for determining a parameter of a field-oriented control, FOC, model for an electric power unit, the electric power unit comprising a three-phase electric motor 10 and an inverter drive 20 for driving the electric motor, the method comprising the steps of: sending a control signal to the inverter drive 20; applying a predefined electric voltage (Vq, Vd) to at least two of the phases of the electric motor by the inverter drive in response to the control signal; measuring an electric current (Iq, Id, Index q for quadrature axis, Index d for direct axis) that flows in the at least two phases of the electric motor 10 in response to the applied electric voltage; and determining the parameter of the FOC model for the electric power unit using a value of the applied predefined electric voltage and a value of the measured electric current.

According to this embodiment the step of applying the predetermined voltage comprises the steps of (i) applying an electric voltage between the at least two phases of the electric motor 10 in accordance with the control signal; (ii) measuring the actual electric voltage between the at least two phases of the electric motor in response to the applied electric voltage; and (iii) adjusting the control signal until the actual electric voltage is equal to the predefined electric voltage. These steps (i), (ii), and (iii) are performed in an electronic feedback loop, thereby automatically adjusting the voltage to the predefined value. Therefore, the measurement can be performed very precise and includes all effects of the inverter drive 20 and other electric components connecting the inverter drive and the electric motor 10.

Summarized, the embodiment of the invention provides the following:

The invention relates to an automatic software tool for optimal tuning of motor control parameters. The automatic tuning allows to find specific motor parameters, effective for different electric motor types (asynchronous induction motor, permanent magnets motors and variable reluctance motors), and those give considerable advantages in motor control and power/torque estimation.

Figure 2:
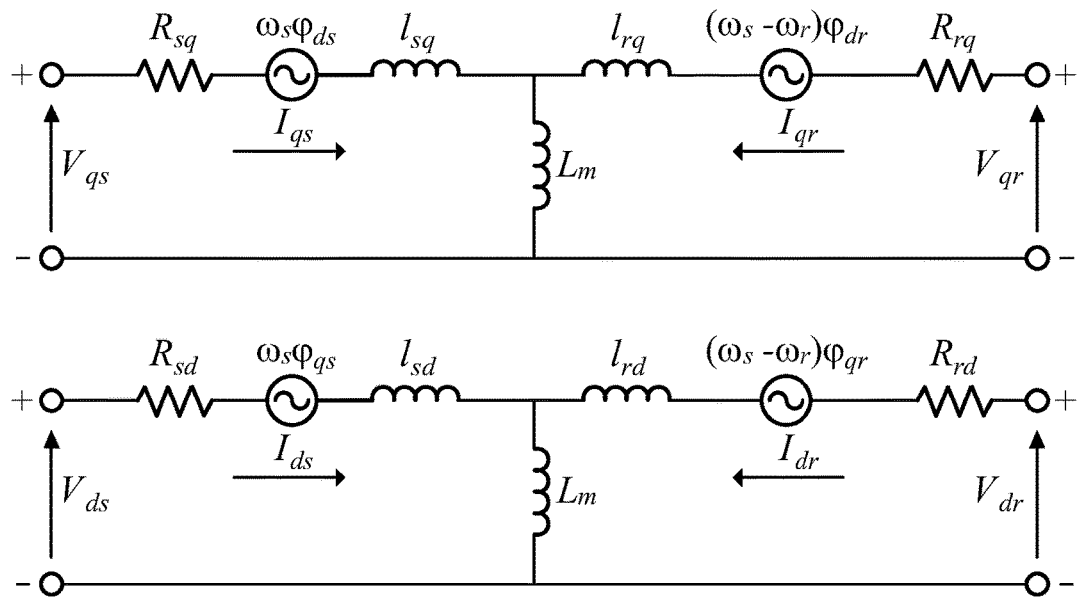
FIG. 2 illustrates equivalent circuits for the driving circuit of FIG. 1.

The inverter uses a Field oriented control algorithm that is based on this concept: torque and flux of the motor can be separately controlled acting on the two components of motor current vector (Iq and Id). As shown in FIG. 1, Iq and Id are regulated in feedback through dedicated PI block regulators, and those need, depending on the particular motor, to be properly set in order to obtain the best performances in motor driving. Any electric motor, independently by the type, can be schematizes with an equivalent electrical model. This can be done for both axes, Q and D. FIG. 2 illustrates equivalent circuits for both axes Q and D of the driving circuit of FIG. 1.

The automatic tool is capable, performing different automatic tests on the motor, to extrapolate some parameters of the equivalent electrical model. Starting from those, the tool can define several other control parameters. Accordingly, some of the parameters are measured and some are calculated by the automatic tool:

Among the parameters, there is a group whose measure is particularly dependent by the ability to force a precise voltage waveform into the motor (Index s for stator, Index r for rotor):

$Rd^* = f(Rsd;Rrd)$ $Ld^* = f(lsd;lrd)$ $Rq^* = f(Rsq;Rrq)$ $Lq^* = f(lsq;lrq)$ $Lm^* = f(Lm)$ The measurement of these parameters will be described in the following.

In order to estimate correctly the value of these parameters, the system needs to apply different type of voltage stimuli, in different moments of the tuning procedure, and to measure the current response of the motor. Depending by the voltage applied, using the motor current and, in some specific test, its transition time (exponential decay time), it is possible to estimate resistive and inductive component values for both axes, Q and D. Those values affect the gain coefficient of the PI blocks 30 (Proportional-Integral regulators) shown in FIG. 1:

$KP\_VD\_GAIN = f(Ld^*)$ $KI\_VD\_GAIN = f(Rd^*)$ $KP\_VQ\_GAIN = f(Lq^*)$ $KI\_VQ\_GAIN = f(Rq^*)$

An accurate setting of the PI block gains, permits to the controller to drive the motor in the best way getting fast dynamic response. In order to get precise estimation, the system has to be capable of producing voltage waveforms having good time and amplitude precision, and of measuring the resulting current with a high resolution. The precision required for voltage applied, makes it necessary to get the actual duty cycle of the square wave applied to the motor terminals compensating the distortion effect of commutation delays and dead times of the power bridge of the inverter. The amplitude of voltage applied to the motor in the different phases of autotuning procedure is quite low. At low voltage, the effect of distortion introduced by commutations delay and dead time is important and it can generate wrong estimation of the parameters affecting the quality of the motor control.

Furthermore, commutation delays and dead time can change from one inverter to another depending on hardware structure and power electronic components used. At the same time, voltage stimuli amplitude can change depending by the motor (changing from one motor to another) and by setup configuration (here setup includes the whole system comprising the inverter; the cables, which can have different length and sections; the power connection system both on inverter and on motor side; the motor itself).

For these reasons it is necessary to have an "universal" method to perform the compensation and it has to be independent by boundary conditions: inverter, motor, test setup.

This is obtained by dedicated hardware circuits and software algorithm according to the invention that permits to set a precise value of the duty cycle produced at the terminals getting a correct and high-resolution measurements of the motor parameters.

Below is a short description of the procedure to measure the main parameters:

1) Measure of the Motor Phase Resistance (Rs):

DC voltage is applied as a step between two motor phase and the flowing current is measured. The ratio between voltage and current gives the resistance (Rs). Depending on type of motor and power sizing, the value of resistance can be very low. For this reason and because the motor is in steady state condition, the voltage that can be applied to the motor is very low in order to keep the current under control and, for this reason, the resolution in very important.

2) Resistances and Inductances of D and Q (Rd*, Rq*; Ld*, Lq*):

The inverter applies voltage square wave pulses to the motor terminals and measures the motor current response. From current response, it is possible to determine the constant time. Starting from the stator transient time constant measured, using and iterative procedure and solving some equations, it is possible to determine the inductances (affecting proportional gain) and resistances (affecting integral gains) that compose the equivalent model of the motor.

3) Magnetizing Inductance (Lm*) and Max Flux:

A simple V/f control with null torque is applied resulting in the magnetization current and the flux that is dependent on voltage applied and motor speed. Magnetizing inductance (Lm) is determined by equation solution. In particular, the frequency is ramped slowly between each point and the motor is allowed to settle at each new operating point before the currents are measured.

According to the magnetization current and the magnetization inductance it is possible apply optimal magnetization for any operating point of the electric motor in order to achieve the most efficient operation depending on an operation mode of the electric motor, for example MTPA (maximum torque per Ampere), MTPV (maximum torque per volt), etc.

Figure 3:
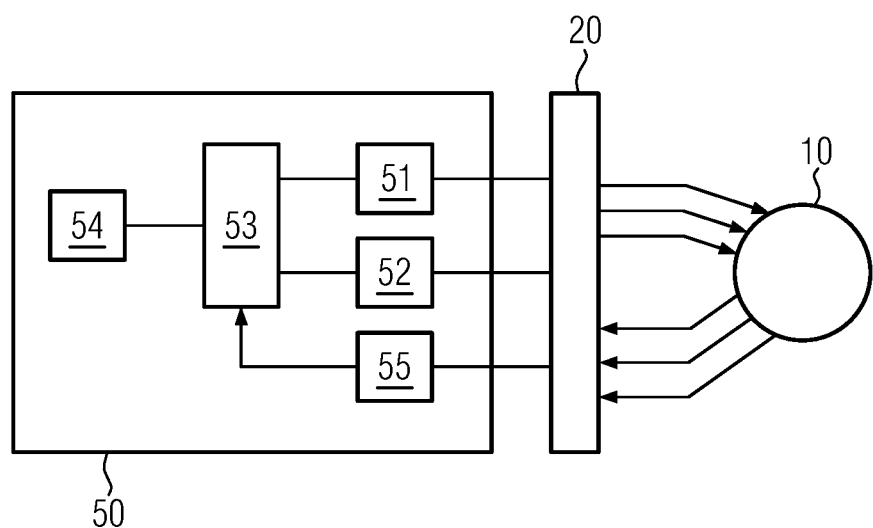
FIG. 3 schematically illustrates an apparatus according to an embodiment of the invention.

FIG. 3 schematically illustrates an embodiment of an apparatus 50 for determining a parameter of a control model for an electric power unit, wherein the electric power unit comprises a three-phase electric motor 10 and an inverter drive 20 for driving the electric motor. The apparatus is connected to the electric power unit via connection terminals of the inverter drive 20.

The apparatus 50 comprises a processing circuitry 50. The processing circuitry 50 comprises a voltage control unit 51 configured to send a control signal for applying an electric voltage between at least two phases of the electric motor 10 to the inverter drive 20 of the electric power unit; a voltage measuring unit 55 configured to measure an actual electric voltage between the at least two phases of the electric motor 10 in response to the applied electric voltage and to adjust the control signal until the actual electric voltage is equal to a predefined electric voltage; a current measuring unit 52 configured to measure an electric current flowing in the at least two phases of the electric motor 10 in response to the applied predefined electric voltage; and a processor 53 configured to determine the parameter of the control model for the electric power unit using a value of the applied predefined electric voltage and a value of the measured electric current.

The determined parameters may be stored in a memory 54. The apparatus may be configured to determine the parameter(s) and to tune the FOC model using the determined parameter(s) within less than a rotation period of the electric motor, preferably less than 0.1 times the rotation period, more preferably less than 0.01 times the rotation period. In this way, the parameter(s) can be tuned in real-time during the operation of the electric motor 10.

Alternatively, the processing circuitry 50 may be integrated into the inverter drive 20.

The accuracy of the parameters determined by the method according to the invention is based on the precision of the applied voltages and for this reason it is necessary to foresee a hardware (voltage measuring unit 55 to measure an actual electric voltage between the at least two phases of the electric motor 10 in response to the applied electric voltage) and software function (adjust the control signal until the actual electric voltage is equal to a predefined electric voltage) to obtain this precision.

The embodiments described above are only exemplary and the full scope of the invention is defined by the claims.

The invention claimed is:

1. A method for determining a parameter of a control model for an electric power unit, the electric power unit comprising a three-phase electric motor and an inverter drive for driving the electric motor, the method comprising:
   sending a control signal to the inverter drive;
   applying a predefined electric voltage to at least two of the phases of the electric motor by the inverter drive in response to the control signal;
   measuring an electric current that flows in the at least two phases of the electric motor in response to the applied electric voltage; and
   determining the parameter of the control model for the electric power unit using a value of the applied predefined electric voltage and a value of the measured electric current.

2. The method according to claim 1, wherein the applying step comprises:
   applying an electric voltage between the at least two phases of the electric motor in accordance with the control signal;
   (ii) measuring the actual electric voltage between the at least two phases of the electric motor in response to the applied electric voltage; and
   (iii) adjusting the control signal until the actual electric voltage is equal to the predefined electric voltage; and
   wherein the steps (i), (ii), and (iii) are performed in an electronic feedback loop.

3. The method according to claim 2, wherein the applying step comprises applying a DC voltage in form of a step, and wherein the determined parameter is a resistance.

4. The method according to claim 2, further comprising at least one selected from the group consisting of (i) measuring a response time between the applied electric voltage and the measured electric current and (ii) measuring a variation, within a fixed time, of an electric current value in response to the applied electric voltage.

5. The method according to claim 1, wherein the applying step comprises applying a DC voltage in form of a step, and wherein the determined parameter is a resistance.

6. The method according to claim 1, further comprising at least one selected from the group consisting of (i) measuring a response time between the applied electric voltage and the measured electric current and (ii) measuring a variation, within a fixed time, of an electric current value in response to the applied electric voltage.

7. The method according to claim 1, wherein the applying step comprises applying a square wave pulse, and wherein the determined parameter is a stator transient time constant.

8. The method according to claim 7, wherein the determined stator transient time constant is used to calculate at least one selected from the group consisting of (i) inductance values and (ii) resistance values of an equivalent model of the motor.

9. The method according to claim 1, wherein a voltage and frequency control is applied and a resulting magnetization current is measured, and a magnetizing inductance is calculated.

10. The method according to claim 9, the determined magnetization current and magnetization inductance are used to calculate an optimal magnetization for any operating point of the electric motor in order to achieve the most efficient operation depending on an operation mode of the electric motor, wherein the most efficient operation comprises the MTPA (maximum torque per Ampere) or MTPV (maximum torque per volt).

11. The method according to claim 9, wherein the frequency is ramped between a plurality of measuring points in time and wherein the motor is allowed to settle to a steady state at each new operating point before the currents are measured.

12. The method according to claim 1, wherein the method is performed continuously during operation of the electric power unit or after a predetermined amount of time has elapsed after an initial parameter determination.

13. An apparatus for determining a parameter of a control model for an electric power unit, the electric power unit comprising a three-phase electric motor and an inverter drive for driving the electric motor, the apparatus comprising a processing circuitry comprising:
   a voltage control unit configured to send a control signal for applying an electric voltage between at least two phases of the electric motor to the inverter drive of the electric power unit;
   a voltage measuring unit configured to measure an actual electric voltage between the at least two phases of the electric motor in response to the applied electric voltage and to adjust the control signal until the actual electric voltage is equal to a predefined electric voltage;

a current measuring unit configured to measure an electric current flowing in the at least two phases of the electric motor in response to the applied predefined electric voltage; and a processor configured to determine the parameter of the control model for the electric power unit using a value of the applied predefined electric voltage and a value of the measured electric current.

14. The apparatus according to claim 13, wherein the processor is configured to determine a response time between the applied electric voltage and the measured electric current.

15. The apparatus according to claim 13, wherein the voltage control unit is configured to send a control signal to the inverter drive to apply a DC voltage in form of a step, and wherein the processor is configured to determine a resistance of the control model based on a value of the DC voltage and the value of the measured electric current.

16. The apparatus according to claim 13, wherein the voltage control unit is configured to send a control signal to the inverter drive to apply a square wave pulse, and wherein the processor is configured to perform at least one selected from the group consisting of: (i) determine a stator transient time constant; (ii) calculate inductance values of an equivalent model of the motor; and (iii) calculate resistance values of an equivalent model of the motor.

17. The apparatus according to claim 13, wherein the voltage control unit is configured to send a control signal to the inverter drive to apply the voltage having a frequency and the current measuring unit is configured to measure a resulting magnetization current, and the processor is configured to calculate a magnetizing inductance.

18. The apparatus according to claim 17, wherein the voltage generating unit is configured to ramp the frequency between a plurality of measuring points in time and the current measuring unit is configured to measure the magnetization currents after the motor has settled to a steady state at each new operating point.

19. The apparatus according to claim 13, wherein the apparatus is configured to perform the parameter determination within at least one selected from the group consisting of: (i) less than a rotation period of the electric motor; (ii) less than 0.1 times the rotation period; (iii) less than 0.01 times the rotation period; and (iv) under operating conditions of the electric power unit.

20. The apparatus according to claim 13, wherein the processor is configured to store the determined parameter in a memory of the inverter drive or wherein the processing circuitry is integrated in the inverter drive.

* * * * *